US007003535B1

(12) United States Patent
Kelley et al.

(10) Patent No.: US 7,003,535 B1
(45) Date of Patent: Feb. 21, 2006

(54) MEDIAN DETERMINATION APPARATUS AND METHOD

(75) Inventors: H. Ray Kelley, Geneva, FL (US); Terreaux J. Williams, Ocoee, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 633 days.

(21) Appl. No.: 10/193,930

(22) Filed: Jul. 12, 2002

(51) Int. Cl.
*G06F 15/00* (2006.01)

(52) U.S. Cl. .................................................. 708/202

(58) Field of Classification Search ................ 708/200, 708/202
See application file for complete search history.

(56) References Cited

U.S. PATENT DOCUMENTS

| | | | | |
|---|---|---|---|---|
| 5,144,568 A | * | 9/1992 | Glover | 708/202 |
| 6,018,750 A | * | 1/2000 | Connell et al. | 708/202 |
| 6,199,084 B1 | * | 3/2001 | Wiseman | 708/304 |

OTHER PUBLICATIONS

Law, George, "A Real-Time Radix-2-Based Median Filtering Algorithm," *IEEE* 1991 Mid. Symp. Circuits and Systems, pp 1121-1124 (1992).

* cited by examiner

*Primary Examiner*—Kakali Chaki
*Assistant Examiner*—Chat C. Do
(74) *Attorney, Agent, or Firm*—Jeffrey D. Myers; Peacock Myers, P.C.

(57) ABSTRACT

The present invention is of a method and apparatus for processing an image comprising a data set of size M (more generally, for determining the median of any data set of size M), comprising receiving each value of the data set as a weighted set of binary digits; adding together a first constant and binary digits of greatest weight of each value of the data set; dividing the result of the adding step by a second constant to generate a binary digit of greatest weight of a median of the data set; calculating for each value a remaining value clamp function for a next lower weight of binary digits; employing results of the calculating step to repeat adding and dividing steps for the next lower weight of binary digits to generate a binary digit of next lower weight of a median of the data set; and repeating the calculating and employing steps, if necessary, for each lower weight of binary digits of the values. The first constant is preferably $2^{N}-1-M$, where N is the least power of 2 that exceeds M, with the second constant being $2^{N-1}$.

21 Claims, 5 Drawing Sheets

MEDIAN DETERMINATION APPARATUS AND METHOD

BACKGROUND OF THE INVENTION

1. Field of the Invention (Technical Field):

The present invention relates to apparatuses and methods for determining the median of a data set, particularly for image processing applications.

2. Background Art

The median of a data set is the value for which there are an equal number of values within the set which are smaller or equal as there are values which are larger or equal. Although there are a number of elegant solutions, the most common method of determining the median utilized is by sorting the set from largest to smallest and then choosing the middle value of the data set. Such methods when implemented to execute as quickly as possible require a large number of gates in a hardware implementation.

A primary advantage of the present invention is that the median is calculated through the use of simple adders, and therefore does not require re-registration of the input data set. In fact, as will be shown, the median can be determined utilizing a fully combinatorial logic solution to produce the output result. This results in a highly optimizable logic solution for Field Programmable Gate Array (FPGA) or Application Specific Integrated Circuit (ASIC) implementation. Additionally, since the arithmetic median is a calculated value, it is unaffected by the ambiguities created when the data set includes large subsets of equivalent values occurring at or near the median value.

The present invention is particularly useful for real-time image processing applications, such as infrared image processing. For example, the invention is useful in local-area gain control applications which are useful in infrared image processing in environments with high temperature contrasts, such as between earth and sky. Communication data processing is another area of application for real-time median determination.

Since development of DC coupled infrared sensors, there has been a marked need to perform real-time two-dimensional median operations as part of dynamic range compression. Heretofore, massive FPGA and ASIC gate assets have been required to determine the median of 3×3, 5×5, and 7×7 image areas. This is because classic compare and swap solutions require a large network of N×(N−1)/2 comparators (or the recursive equivalent) to locate the median of N input values Prior arithmetic solutions required an N input adder network followed by a comparator circuit to determine the bit serial solution. This was more efficient for larger input sets but the concatenation of the adder and comparator introduces timing problems in higher clock rate systems. Anticipated detector geometries suggest much larger area median value determinations than 7×7 will be needed in the near future.

An example of an arithmetic solution requiring a comparator is presented by Law, "A Real-Time Radix-2-Based Median Filtering Algorithm", IEEE 1991 Mid. Symp. Circuits and Systems, pp. 1121–24 (1992). Law identifies, on a bit by bit basis, the median value by adding all of the $2^N$ weighted input values together and then determines the majority of the input values (which, by definition, is the $2^N$ weighted median value).

The present invention eliminates the need for a concatenated comparator stage by introducing a constant K into the adder network. K is determined such that a singular $2^{M-1}$ output from the adder network represents the majority determination and therefore the median value

SUMMARY OF THE INVENTION (DISCLOSURE OF THE INVENTION)

The present invention is of a method and apparatus for processing an image comprising a data set of size M (more generally, for determining the median of any data set of size M), comprising: receiving each value of the data set as a weighted set of binary digits, adding together a first constant and binary digits of greatest weight of each value of the data set; dividing the result of the adding step by a second constant to generate a binary digit of greatest weight of a median of the data set; calculating for each value a remaining value clamp function for a next lower weight of binary digits; employing results of the calculating step to repeat adding and dividing steps for the next lower weight of binary digits to generate a binary digit of next lower weight of a median of the data set, and repeating the calculating and employing steps, if necessary, for each lower weight of binary digits of the values. In the preferred embodiment, the first constant is $2^N-1-M$, where N is the least power of 2 that exceeds M, and the second constant is $2^{N-1}$. Dividing preferably occurs by choosing the binary digit of weight $2^{N-1}$ of the result of the corresponding addition. The median may be computed in a single clock cycle, or fewer than all bits of the median may be computed in a single clock cycle. Each bit of the median may be calculated recursively. The median is calculated without sorting the data set and without using a comparator, preferably employing a Field Programmable Gate Array or an Application Specific Integrated Circuit.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

(BEST MODES FOR CARRYING OUT THE INVENTION)

Figure 1A:
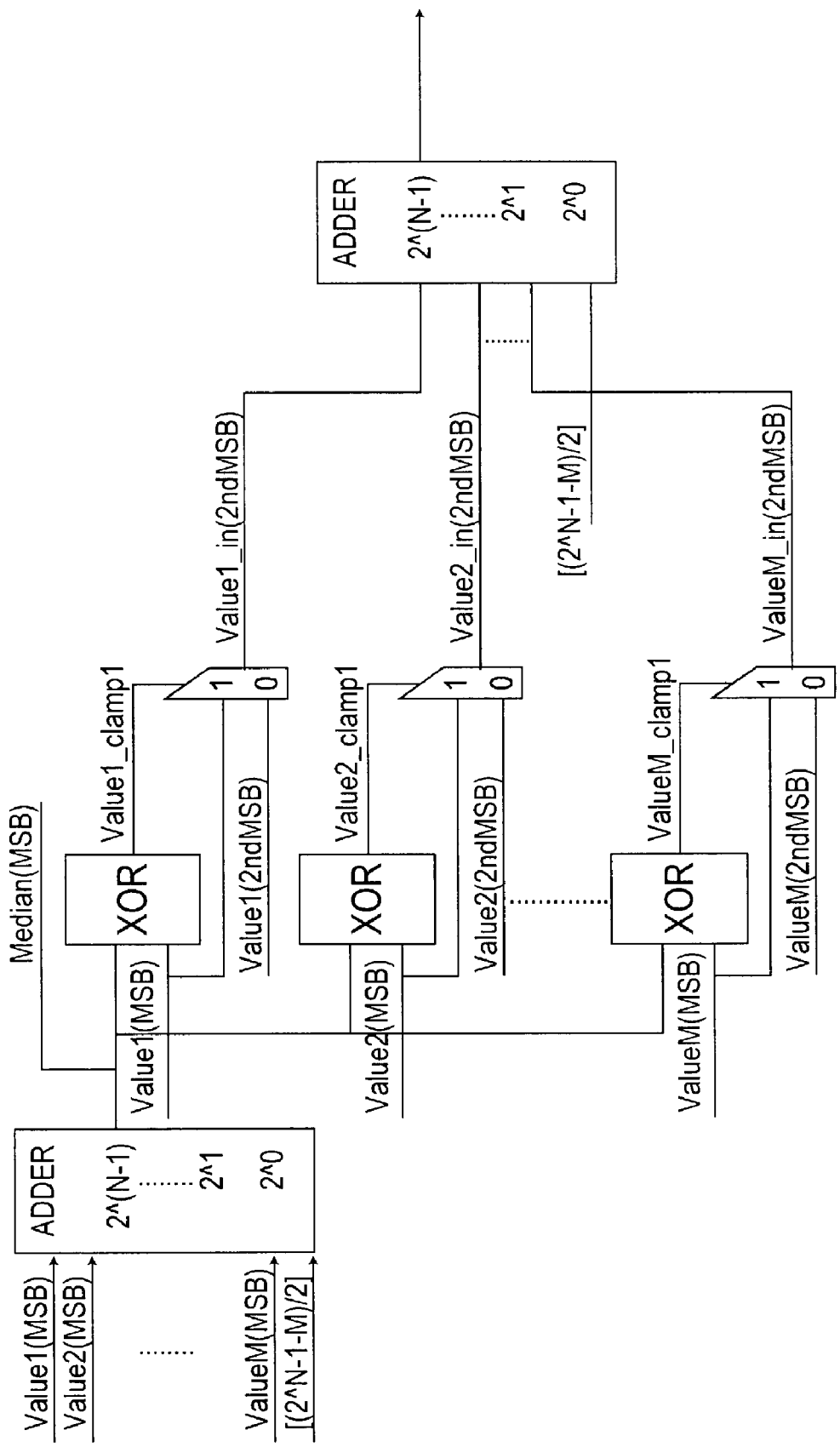
FIGS. 1a and 1b (collectively FIG. 1) comprise a logic gate diagram of the preferred combinatorial embodiment of the invention.

The present invention is of an apparatus and method for resolving the median of a data set without using sorting or comparators. The invention comprises three principal embodiments: combinatorial; pipelined; and recursive.

The most straightforward and fastest solution for arithmetically determining the median of a set of input values is the combinatorial solution of the invention. This solution permits a set of data values and parameters to be immediately processed (via asynchronous propagation delays) to produce a value which represents the median of the input data set.

For a set of quantity M values (Value1, Value2, Value3, . . . , ValueM) where each value is composed of a weighted set of binary digits identified as MSB, 2ndMSB, 3rdMSB, . . . , LSB, where MSB is "Most Significant Bit" and LSB is "Least Significant Bit", the invention employs the following steps to compute the resultant median value Median:

Median $(MSB)$=[Value1$(MSB)$+Value2$(MSB)$+Value3 $(MSB)$+ . . . +ValueM$(MSB)$+$((2^N-1-M)/2)]/2^(N-1)$.

where $2^N$ is that power of 2 which exceeds the size of the input data set, $(2^N)-1-M$ is an integer value representing the difference between the quantity of values in the input set and a value which is one less that a whole $2^N$ number, and $2^(N-1)$ is an integer value which is one half of $2^N$. Note that division by $2^(N-1)$ can be accomplished by simply choosing an appropriately weighted binary value from a single adder output. Additionally note that the symbol "+" represents a binary addition as opposed to the symbol "OR" which represents a logic operand.

Following this, a remaining value clamp function is implemented as follows:

Value1_clamp1=Value1$(MSB)$XOR Median$(MSB)$

Value2_clamp1=Value2$(MSB)$XOR Median$(MSB)$

. . .

ValueM_clamp1=ValueM$(MSB)$XOR Median$(MSB)$

The input binary values to the 2nd stage are assigned as follows:

IF Value1_clamp1=true

Value1_in(2ndMSB)=Value1$(MSB)$

ELSE

Value1_in(2ndMSB)=Value1(2ndMSB)

IF Value2_clamp1=true

Value2_in(2ndMSB)=Value2$(MSB)$

ELSE

Value2_in(2ndMSB)=Value2(2ndMSB)

. . .

IF ValueM_clamp1=true

ValueM_in(2ndMSB)=ValueM$(MSB)$

ELSE

ValueM_in(2ndMSB)=ValueM(2ndMSB)

The arithmetic expression for the 2nd most significant median binary value is then:

Median (2ndMSB)=[Value1_in(2ndMSB)+Value2_in (2ndMSB)+ . . . +ValueM_in(2ndMSB)+$((2^N-1-M)/2)]/2^(N-1)$ The next stage remaining value clamp function is as follows:

Value1_clamp2=Value1(clamp1)  OR  (Value1_in (2ndMSB) XOR Median(2ndMSB))

Value2_clamp2=Value2(clamp1)  OR  (Value2_in (2ndMSB) XOR Median(2ndMSB))

. . .

ValueM_clamp2=ValueM(clamp1)  OR  (ValueM_in (2ndMSB) XOR Median(2ndMSB))

The input binary values to the 3rd stage are assigned as follows:

IF Value1_clamp2=true

Value1_in(3rdMSB)=Value1_in(2ndMSB)

ELSE

Value1_in(3rdMSB)=Value1(3rdMSB)

IF Value2_clamp2=*true*

Value2_in(3rdMSB)=Value2_in(2ndMSB)

ELSE

Value2_in(3rdMSB)=Value2(3rdMSB)

. . .

IF ValueM_clamp2=true

ValueM_in(3rdMSB)=ValueM_in(2ndMSB)

ELSE

ValueM_in(3rdMSB)=ValueM(3rdMSB)

The arithmetic expression for the 3rd most significant median value is then:

Median (3rdMSB)=[Value1_in(3rdMSB)+Value2_in (3rdMSB)+ . . . +ValueM_in(3rdMSB)+ $((2^N-1-M)/2)]/2^(N-1)$ This process continues for each Median binary value computation. Finally, the LSB clamp operator applied to the final adder stage is:

Value1_clampLSB=Value1_clamp2_2ndLSB  OR (Value1_in(2ndLSB) XOR Median(2ndLSB))

Value2_clampLSB=Value2_clamp2_2ndLSB  OR (Value2_in(2ndLSB) XOR Median(2ndLSB))

. . .

ValueM_clampLSB=ValueM_clamp_2ndLSB  OR (ValueM_in(2ndLSB) XOR Median(2ndLSB))

The input binary values to the final stage are assigned as follows:

IF Value1_clampLSB=true

Value1_in($LSB$)=Value1_in($2ndLSB$)

ELSE

Value1_in($LSB$)=Value1($LSB$)

IF Value2_clampLSB=true

Value2_in($LSB$)=Value2_in($2ndLSB$)

ELSE

Value2_in($LSB$)=Value2($LSB$)

. . .

IF ValueM_clampLSB=true

ValueM_in($LSB$)=ValueM_in($2ndLSB$)

ELSE

ValueM_in($LSB$)=ValueM($LSB$)

The arithmetic expression for the least significant median value is then:

$$\text{Median}(LSB) = [\text{Value1\_in}(LSB) + \text{Value2\_in}(LSB) + \ldots + \text{ValueM\_in}(LSB) + ((2^{N-1} - M)/2)] / 2^{(N-1)}$$

Figure 1B:
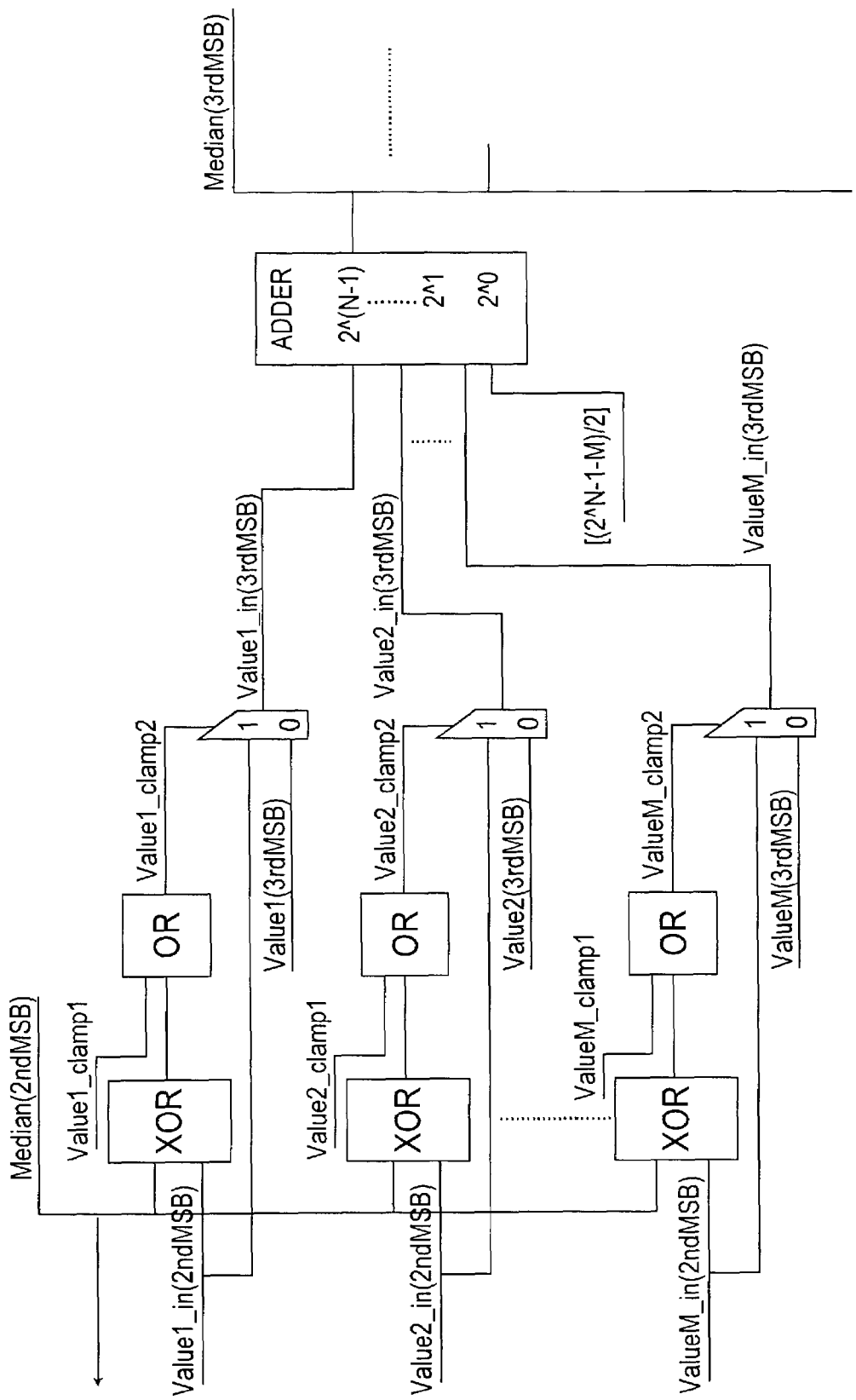

An implementation of the combinatorial embodiment of the invention is illustrated in the functional diagram of FIG. 1.

Note that all of the above equations and functional diagrams are combinatorial and, therefore, are achievable within a single sample cycle and without requiring positional movement or sequential processing of input data values. Two synchronous adaptations are available should the cycle time available be less than the combinatorial propagation delays in the above noted equations. These two adaptations are referred to as the pipelined solution and the recursive solution. Each has tradeable advantages and/or disadvantages based on the particular application, the available component real estate, and the circuit timing requirements.

Should input sample sets be applied to the combinatorial network identified above at a rate that prohibits a totally combinatorial solution, it is possible to achieve the same results by sequentially pipelining the process results along with the remaining binary values to be processed. For instance, where the clock period only permits two bits of the Median value to be computed in a single cycle, the invention may be modified to employ the following steps:

The first two Median bit calculations are identical but, due to pipelining requirements, the successive Median computation values preferably employ the following modifications (as described in Verilog):

Always@(pipeline_clock)

Begin

IF Value1_clamp2=*true*

Value1_d($MSB, 2ndMSB, \ldots, LSB$)=Value1_in($2ndMSB$)

ELSE

Value1_d($MSB, 2ndMSB, \ldots, LSB$)=Value1($3rdMSB, 4thMSB, \ldots, LSB$)

IF Value2_clamp2=*true*

Value2_d($MSB, 2ndMSB, \ldots, LSB$)=Value2_in($2ndMSB$)

ELSE

Value2_d($MSB, 2ndMSB, \ldots, LSB$)=Value2($3rdMSB, 4thMSB, \ldots, LSB$)

. . .

IF ValueM_clamp2=true

ValueM_d($MSB, 2ndMSB, \ldots, LSB$)=ValueM_in($2ndMSB$)

ELSE

ValueM_d($MSB, 2ndMSB, \ldots, LSB$)=ValueM($3rdMSB, 4thMSB, \ldots LSB$)

End

The following additions are employed to accommodate output value pipeline delays:

Always@(pipeline_clock)

Begin

Median_d($MSB$)=Median($MSB$)

Median_d($2ndMSB$)=Median($2ndMSB$)

End

Note that the suffix "_d" is used herein to annotate a register which provides a single clock delay between the input data set and computation and the successive pipelined process. Additionally note that since the upper two bits of the median have been calculated and those respective input values are no longer needed, the ValueX_d register set is dimensioned as two bits shorter than the input values Input_value1, Input_value2, . . . , Input_valueM.

The next two stages' clamp function functions just like the first two stage's clamp function with the exception being the use of the ValueX_d register as the input value set instead of the ValueX inputs.

The arithmetic expression for the 3rd most significant median value is then:

$$\text{Median}(3rdMSB) = [\text{Value1\_d}(MSB) + \text{Value2\_d}(MSB) + \ldots \text{ValueM\_d}(MSB) + ((2^{N-1} - M)/2)] / 2^{(N-1)}$$

which is similarly dealt with for the 4th MSB value.

The successive computation equations require the following additions:

Always@(pipeline_clock)

Begin

IF Value1_clamp4=true

Value1_dd($MSB, 2ndMSB, \ldots, LSB$)=Value1_in($4thMSB$)

ELSE

Value1_dd($MSB, 2ndMSB, \ldots, LSB$)=Value1_d($3rdMSB, 4thMSB, \ldots LSB$)

IF Value2_clamp4=true

Value2_dd(MSB,2ndMSB, . . . LSB)=Value2_in(4thMSB)

ELSE

Value2_dd(MSB,2ndMSB, . . . , LSB)=Value2_d(3rdMSB,4thMSB, . . . , LSB)

. . .

IF ValueM_clamp4=true

ValueM_dd(MSB,2ndMSB, . . . , LSB)=ValueM_in(4thMSB)

ELSE

ValueM_dd(MSB,2ndMSB, . . . , LSB)=ValueM_d(3rdMSB,4thMSB, . . . , LSB)

End

Always@(pipeline_clock)
  Begin

Median_dd(MSB)=Median_d(MSB)

Median_dd(2ndMSB)=Median_d(2ndMSB)

Median_dd(3rdMSB)=Median(3rdMSB)

Median_dd(4thMSB)=Median(4thMSB)

End

The arithmetic expression for the 5th most significant median value is then:

Median (5thMSB)=[Value1_dd(MSB)+Value2_dd(MSB)+ . . . , ValueM_dd(MSB)+ ((2^N−1−M)/2)]/2^(N−1)

Note that with each successive computation of the median solution the input data sets may be shortened to exclude the MSB and 2ndMSB of the previous pipeline stage.

The final median result is computed as follows:

Solution=Median_d..d(MSB, . . . , LSB),Median(2ndLSB),Median(LSB)

This permits an optimization of registers but still requires an increase in logical elements over the fully combinatorial solution since both the unprocessed input data bits and the previously computed Median results must be registered at each stage of the pipeline.

Note that this solution utilizes essentially the same combinatorial logic structure as in the first embodiment while adding register delays to input data values and the output median solution. This approach, therefore, results in a larger component area solution but permits a significantly more rapid application of input data sets into the median computation process (i.e., input speed increase versus a larger geometry).

Figure 2A:
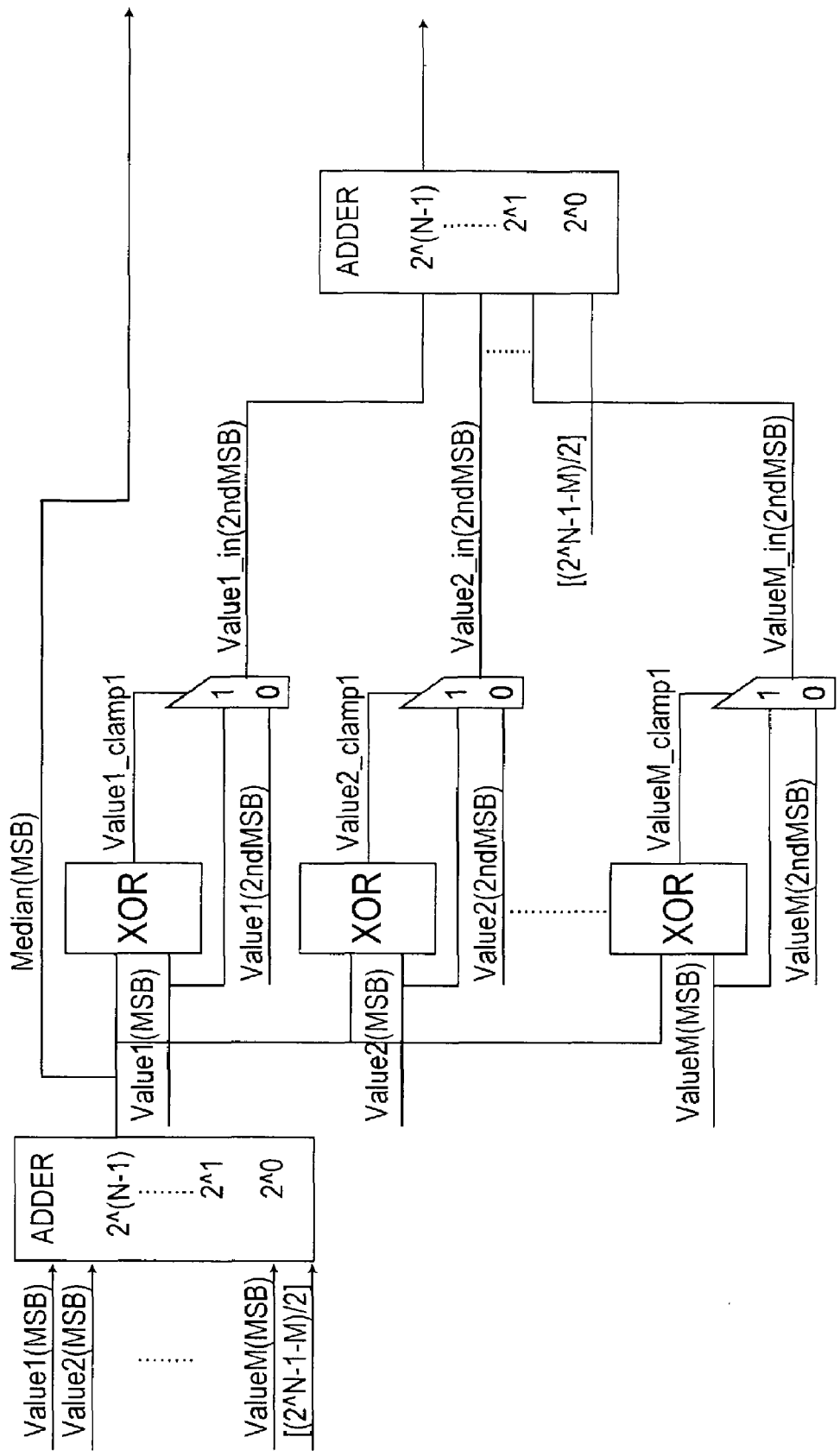
FIGS. 2a and 2b (collectively FIG. 2) comprise a logic gate diagram of the preferred pipelined embodiment of the invention.
Figure 2B:
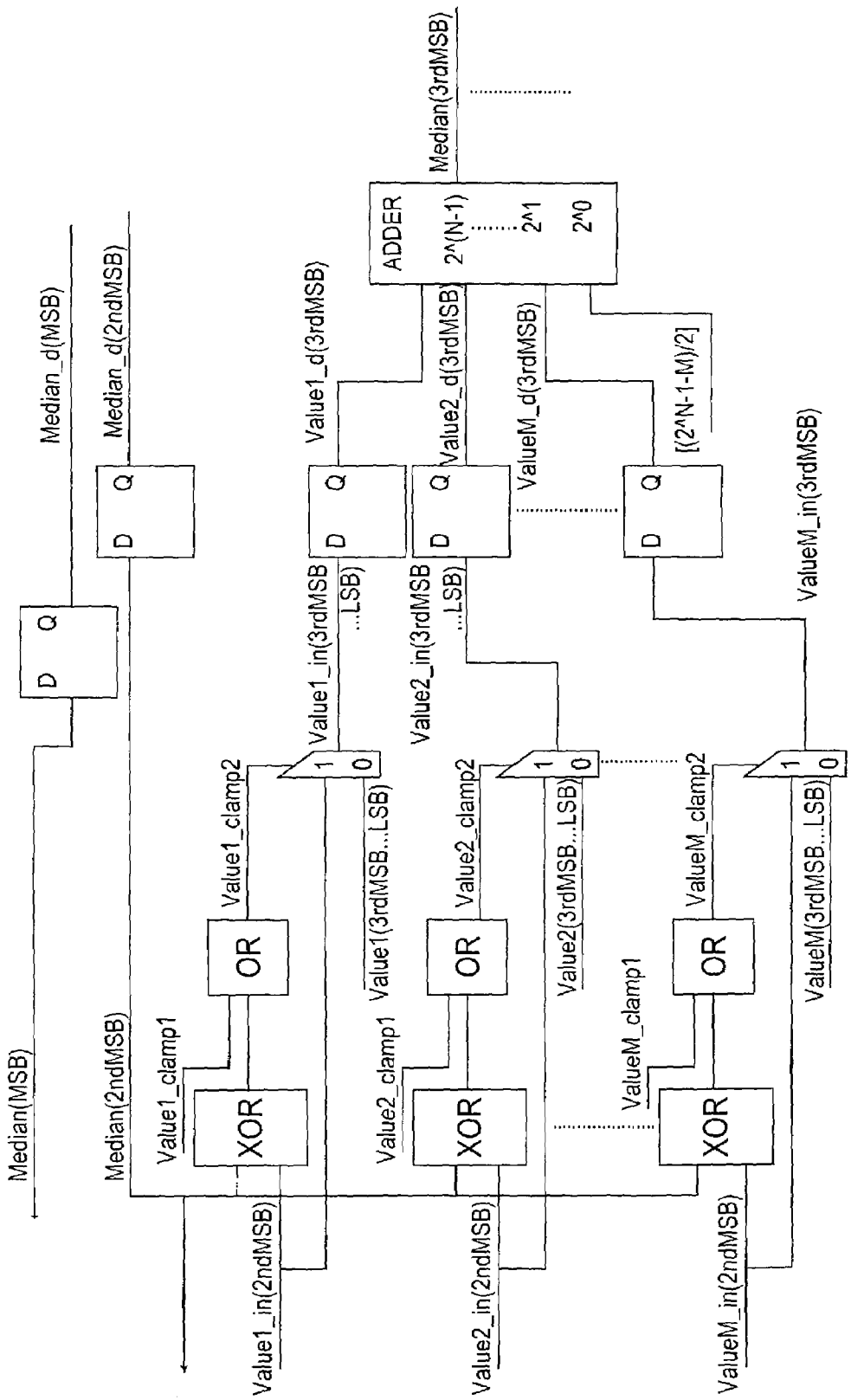

An implementation of the pipelined embodiment of the invention is illustrated in the functional diagram of FIG. 2.

Where speed is not as great of an issue but component area is, there is a third architecture available for the arithmetic computation of the invention. In this architecture, the input values are processed serially through a common adder and clamp logic network developing a serial solution to the Median determination. For instance, if R+1 or more clock cycles are available between input sample sets, the equations would appear as follows.

For a set of quantity M values and an input signal compute_median which is true during the R clock cycles required to compute the median value to R significant bits:

IF Clamp1=1

Value1_in =Input_Register1(LSB)

ELSE

Value1_in =Input_Register1(MSB)

IF Clamp2=1

Value2_in =Input_Register2(LSB)

ELSE

Value2_in=Input_Register2(MSB)

. . .

IF ClampM=1

ValueM_in==Input_RegisterM(LSB)

ELSE

ValueM_in=Input_RegisterM(MSB)

Note that for the purposes of logic minimization, the input register LSB for each input value is serving double duty: (1) it is loaded initially with the original input value and then (2) it serves as the memory element for the clamped input bit assignment for the non-median values. Other logic design techniques can achieve this same result.

Next is the adder function used to determine the next median bit value

---

Median = [Value1_in + Value2_in + Value3_in + . . . + ValueM_in + ((2^N-1-M)/2)]/2^(N-1)
Always@(clock)
Begin
   IF compute median = false
      Input_Register1 = Value1
   ELSE
      Input_Register1(MSB, 2ndMSB, . . . , 2ndLSB, LSB) =
         Input_Register1(2ndMSB, . . . , LSB, Value1_in)
End
Always@(clock)
Begin
   IF compute_median = false
      Clamp1 = 0

```
        ELSEIF (Median XOR Value1_in)
            Clamp1 = 1
        ELSE
            Clamp1 = Clamp1
    End
Always@(clock)
Begin
    IF compute_median = false
        Input_Register2 = Value2
    ELSE
        Input_Register2(MSB, 2ndMSB, . . . , 2ndLSB, LSB) =
            Input_Register2(2ndMSB, . . . , LSB Value2_in)
    End
Always@(clock)
Begin
    IF compute_median = false
        Clamp2 = 0
    ELSEIF (Median XOR Value2_in)
        Clamp2 = 1
    ELSE
        Clamp2 = Clamp2
End
    . . .
Always@(clock)
Begin
    IF clear = true
        Input_RegisterM = valueM
    ELSE
        Input_RegisterM(MSB, 2ndMSB, . . . , 2ndLSB, LSB) =
            Input RegisterM(2ndMSB, . . . , LSB, ValueM_in)
    End
Always@(clock)
Begin
    IF compute_median = true
        Solution(MSB, 2ndMSB, . . . , LSB) = Solution(2ndMSB, . . . , LSB, Median)
    ELSE
        Solution = Solution
End
```

Note that the above identified architecture preferably employs the addition of an input load/shift register, a Flip-Flop register (for the clamp detection) for each input value, and an output shift register to hold the median solution. Still, the recursive solution permits re-use of the adder function, which can result in a significant reduction in total logic gates required versus the other two embodiments of the invention.

Figure 3:
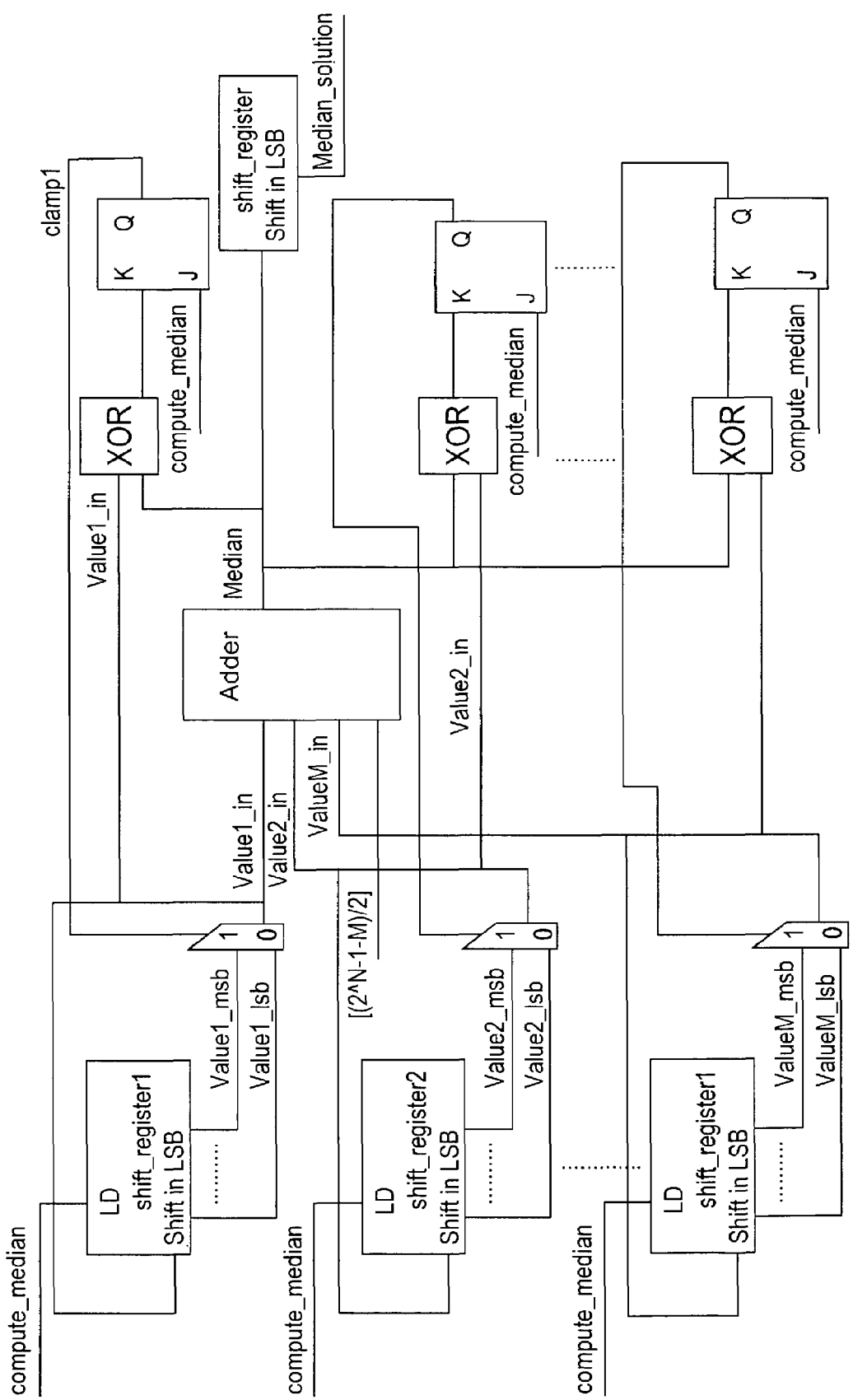
FIG. 3 is a logic gate diagram of the preferred recursive embodiment of the invention.

An implementation of the recursive embodiment of the invention is illustrated in the functional diagram of FIG. 3.

In conclusion, the present invention presents a flexible, exceptionally efficient apparatus and methodology to solve a complex real-time processing problem It is achievable utilizing primitive logic cells with minimal I/O and gate structure. It is also applicable to multiple architectural implementations, each providing advantages in speed, component real estate, and/or complexity. Lastly, the present invention permits a simple growth path for increasingly larger input data sets.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference

What is claimed is:

1. A method of processing an image comprising a data set of size M, the method comprising the steps of:

receiving each value of the data set as a weighted set of binary digits;

adding together a first constant and binary digits of greatest weight of each value of the data set;

dividing the result of the adding step by a second constant to generate a binary digit of greatest weight of a median of the data set;

calculating for each value a remaining value clamp function for a next lower weight of binary digits;

employing results of the calculating step to repeat adding and dividing steps for the next lower weight of binary digits to generate a binary digit of next lower weight of a median of the data set; and repeating the calculating and employing steps, if necessary, for each lower weight of binary digits of the values.

2. The method of claim 1 wherein in the adding steps the first constant is $2^{N-1}-M$, where N is a least power of 2 that exceeds M.

3. The method of claim 2 wherein in the dividing steps the second constant is $2^{N-1}$.

4. The method of claim 3 wherein the dividing steps comprise choosing a binary digit of weight $2^{N-1}$ of the result of the corresponding adding step.

5. The method of claim 1 wherein the method is completed in a single clock cycle.

6. The method of claim 1 wherein fewer than all bits of the median are computed in a single clock cycle and in each clock cycle the method is performed for that many fewer bits of the median.

7. The method of claim 1 wherein each bit of the median is calculated by the method recursively.

8. The method of claim 1 wherein the method is implemented without sorting the data set and without using a comparator within a Field Programmable Gate Array.

9. The method of claim 1 wherein the method is implemented without sorting the data set and without using a comparator within an Application Specific Integrated Circuit.

10. A method of determining a median of an image data set of size M, the method comprising the steps of:
   receiving each value of the image data set as a weighted set of binary digits;
   adding together a first constant and binary digits of greatest weight of each value of the image data set;
   dividing the result of the adding step by a second constant to generate a binary digit of greatest weight of a median of the image data set;
   calculating for each value a remaining value clamp function for a next lower weight of binary digits;
   employing results of the calculating step to repeat adding and dividing steps for the next lower weight of binary digits to generate a binary digit of next lower weight of a median of the image data set; and
   repeating the calculating and employing steps, if necessary, for each lower weight of binary digits of the values.

11. An image processing apparatus for processing an image comprising a data set of size M, said apparatus comprising:
   means for receiving each value of the data set as a weighted set of binary digits;
   means for adding together a first constant and binary digits of greatest weight of each value of the data set;
   means for dividing the result provided by said adding means by a second constant to generate a binary digit of greatest weight of a median of the data set;
   means for calculating for each value a remaining value clamp function for a next lower weight of binary digits;
   means for employing results provided by said calculating means to repeat adding and dividing for the next lower weight of binary digits to generate a binary digit of next lower weight of a median of the data set; and
   means for repeating calculating and employing, if necessary, for each lower weight of binary digits of the values.

12. The apparatus of claim 11 wherein in said adding means said first constant is $2^N-1-M$, where N is a least power of 2 that exceeds M.

13. The apparatus of claim 12 wherein in said dividing means said second constant is $2^{N-1}$.

14. The apparatus of claim 13 wherein said dividing means comprise means for choosing a binary digit of weight $2^{N-1}$ of the result provided by a corresponding adding means.

15. The apparatus of claim 11 wherein a median calculation for the data set is completed in a single clock cycle.

16. The apparatus of claim 11 wherein fewer than all bits of the median are computed in a single clock cycle and in each clock cycle said apparatus operates on that many fewer bits of the median.

17. The apparatus of claim 11 wherein each bit of the median is calculated recursively.

18. The apparatus of claim 11 wherein said apparatus operates without sorting the data set and without using a comparator.

19. The apparatus of claim 11 comprising a Field Programmable Gate Array.

20. The apparatus of claim 11 comprising an Application Specific Integrated Circuit.

21. An apparatus for computing a median of an image data set of size M, said apparatus comprising:
   means for receiving each value of the image data set as a weighted set of binary digits;
   means for adding together a first constant and binary digits of greatest weight of each value of the image data set;
   means for dividing the result provided by said adding means by a second constant to generate a binary digit of greatest weight of a median of the image data set;
   means for calculating for each value a remaining value clamp function for a next lower weight of binary digits;
   means for employing results provided by said calculating means to repeat adding and dividing for the next lower weight of binary digits to generate a binary digit of next lower weight of a median of the image data set; and
   means for repeating calculating and employing, if necessary, for each lower weight of binary digits of the values.

* * * * *

UNITED STATES PATENT AND TRADEMARK OFFICE
CERTIFICATE OF CORRECTION

| | | |
|---|---|---|
| PATENT NO. | : 7,003,535 B1 | Page 1 of 1 |
| APPLICATION NO. | : 10/193930 | |
| DATED | : February 21, 2006 | |
| INVENTOR(S) | : Kelley et al. | |

It is certified that error appears in the above-identified patent and that said Letters Patent is hereby corrected as shown below:

<u>Column 1</u>,
Line 3, before "BACKGROUND OF THE INVENTION" insert the following:
-- GOVERNMENT RIGHTS
The U.S. Government has a paid-up license in this invention and the right in limited circumstances to require the patent owner to license others on reasonable terms as provided for by the terms of Government Contract No. DAAH-23-00-C-0174. --.

Signed and Sealed this

Eleventh Day of July, 2006

JON W. DUDAS
*Director of the United States Patent and Trademark Office*